United States Patent [19]

Shuler

[11] 4,266,626
[45] May 12, 1981

[54] STEERING SYSTEM WITH INTERLOCK VALVES

[75] Inventor: Lucien B. Shuler, Bettendorf, Iowa

[73] Assignee: Caterpillar Tractor Co., Peoria, Ill.

[21] Appl. No.: 89,119

[22] PCT Filed: Jun. 13, 1979

[86] PCT No.: PCT/US79/00415

§ 371 Date: Jun. 13, 1979

§ 102(e) Date: Jun. 13, 1979

[87] PCT Pub. No.: WO80/02824

PCT Pub. Date: Dec. 24, 1980

[51] Int. Cl.³ .............................................. B62D 11/04
[52] U.S. Cl. ..................................... 180/6.48; 60/428;
60/445; 180/6.66; 180/6.7
[58] Field of Search ................... 180/6.48, 6.5, 6.66,
180/6.7; 60/428, 445

[56] References Cited

U.S. PATENT DOCUMENTS

| | | |
|---|---|---|
| 2,774,434 | 12/1956 | Ferris . |
| 3,247,669 | 4/1966 | Hann . |
| 3,434,427 | 3/1969 | Smith . |
| 3,526,288 | 9/1970 | Cryder ................................. 180/6.48 |
| 3,627,070 | 12/1971 | Colten . |
| 3,805,676 | 4/1974 | Hamma . |
| 3,807,174 | 4/1974 | Wagenseil . |
| 3,855,792 | 12/1974 | Bojas . |
| 3,898,807 | 8/1975 | Habiger . |
| 3,946,560 | 3/1976 | MacIntosh ........................ 180/6.48 |
| 3,952,514 | 4/1976 | Habiger . |
| 3,990,320 | 11/1976 | Habiger . |
| 3,996,743 | 12/1976 | Habiger . |
| 4,041,702 | 8/1977 | Habiger . |
| 4,182,125 | 1/1980 | Spivey ................................... 60/445 |

Primary Examiner—John P. Silverstrim
Attorney, Agent, or Firm—Phillips, Moore, Weissenberger, Lempio & Majestic

[57] ABSTRACT

The drives (34,34') of a vehicle are each driven by a pump (18) and motor (22) of a hydrostatic transmission (23). A servo-system (20) associated with each pump (18) is adapted to be controlled by a steering arrangement (35,36) for selectively rotating the drives (34,34') relative to each other. An interlock valve (43,44) is associated with each steering arrangement to stop the drives (34,34') of the vehicle when steering pedals (37,38) thereof are both depressed into certain positions (N,R) of operation. Thus, the operator of the vehicle is prevented from placing the vehicle in an unwanted mode of operation, such as in reverse, when the operator desires another mode of operation, such as braking of the vehicle.

10 Claims, 6 Drawing Figures

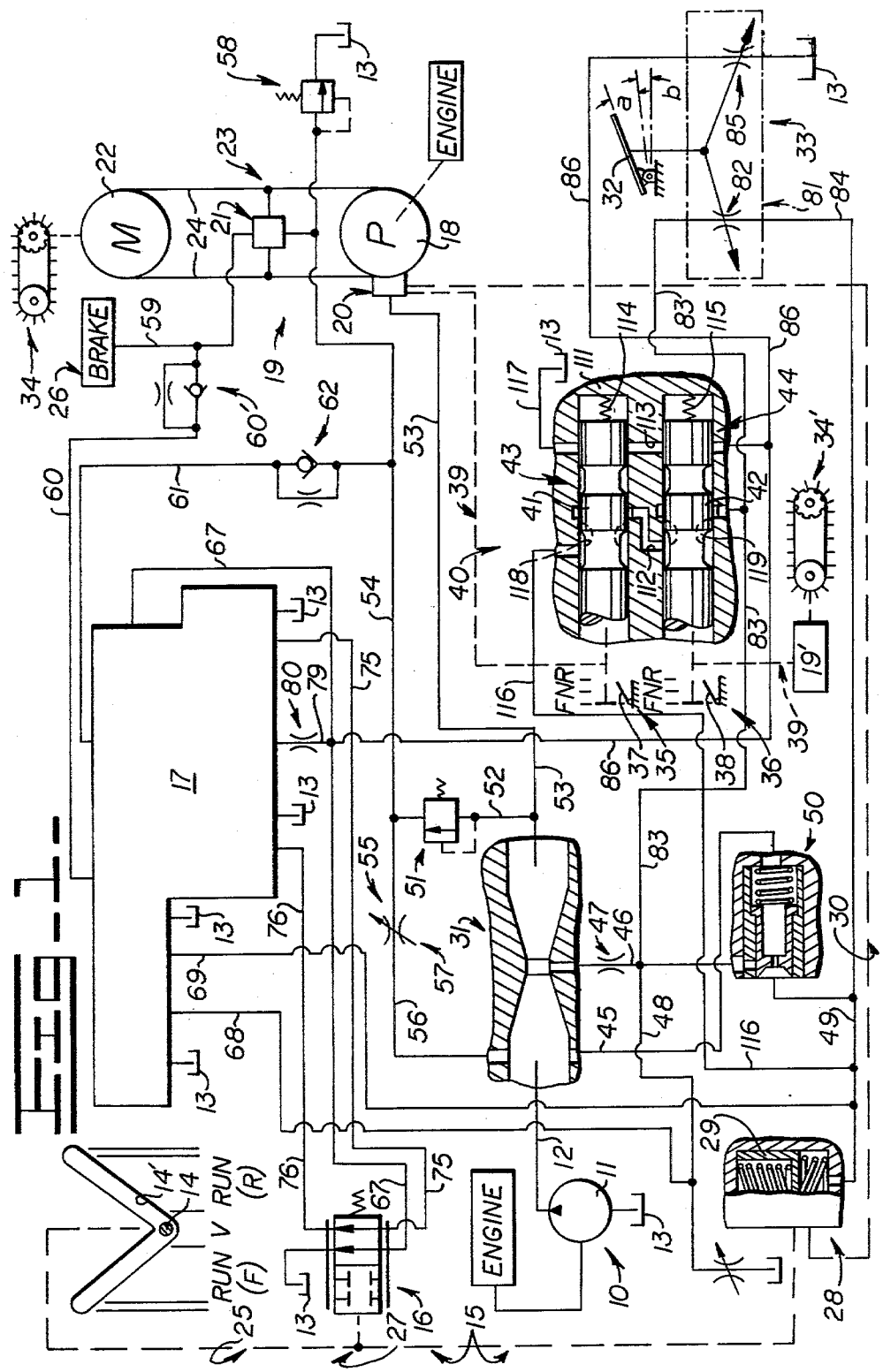

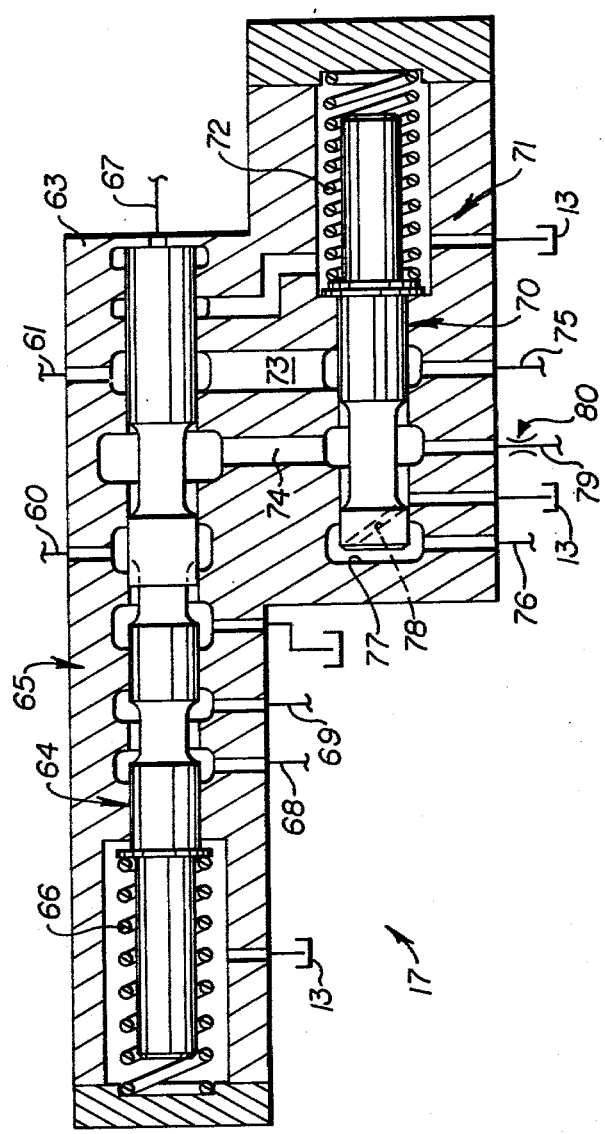

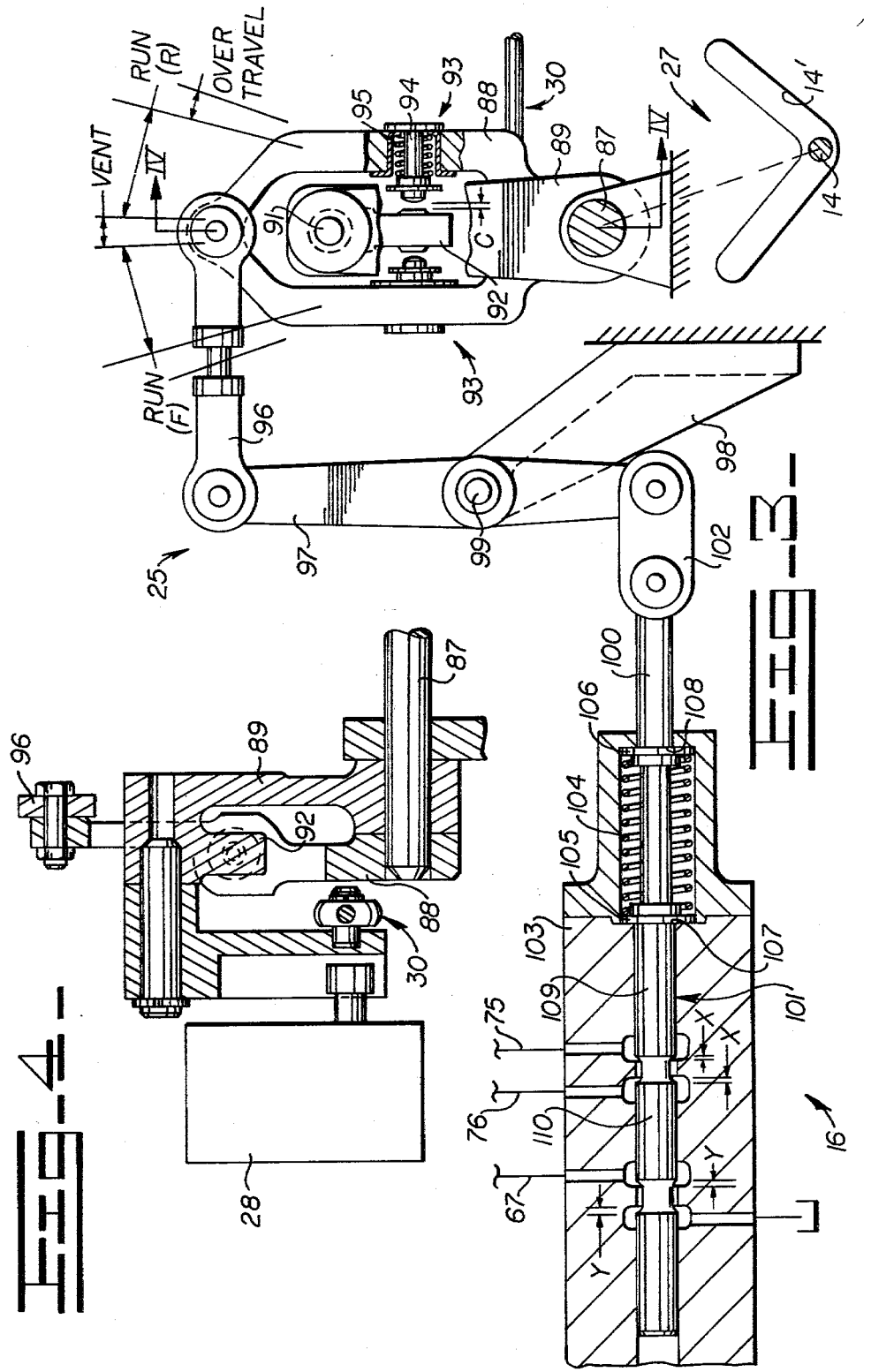

4,266,626

STEERING SYSTEM WITH INTERLOCK VALVES

TECHNICAL FIELD

This invention relates to a steering system for a vehicle wherein steering pedals thereof will stop the vehicle automatically when depressed to preselected positions of operation.

BACKGROUND ART

A conventional track-type tractor of the pedal steer type comprises a pair of pedals for selectively actuating steering clutches for controlling the relative speeds and directions of the tracks thereof. Full depression of one of the pedals will normally brake the track associated therewith. Knowing this, an operator may choose to stop the vehicle by fully depressing both steering pedals simultaneously. Although full depression of the steering pedals on the above type of tractor will provide the desired braking effect, a corresponding depression of the steering pedals employed on a track-type tractor of the type which employs hydrostatic transmissions for driving the tracks thereof will place the vehicle in an unwanted mode of operation. In particular, each steering pedal is sequentially movable through forward (or reverse), neutral, and reverse (or forward) positions of operations whereby the operator may steer the vehicle by rotating the tracks relative to each other. Should the operator desire to brake the vehicle while travelling in one direction, his past experience with the above clutch-actuated type of steering system would dictate that he fully depress both steering pedals to effect the same. However, such depression of the pedals will function to undesirably counter-rotate the tracks.

One solution to this problem is the provision of a mechanical blocker associated between the two steering pedals whereby when one pedal is depressed, depression of the other pedal will be limited in order to prevent unwanted modes of operation of the vehicle. However, such mechanical blockers exhibit certain deficiencies, including a difficulty for the operator to readily determine the neutral position of a particular pedal.

DISCLOSURE OF THE INVENTION

The present invention is directed to overcoming one or more of the problems as set forth above.

In one aspect of this invention, a vehicle comprises first and second drives, fluid actuating means for selectively varying the speed of the drives, control means for controlling the fluid actuating means, and a pair of steering means for selectively controlling the actuating means, independently of actuation of the control means, to steer the vehicle. The invention herein is directed to interlock means adapted to stop the drives and the vehicle in response to movement of both of the first and second steering means to preselected ones of the positions of operation thereof. The interlock means includes first and second valves responsive to movement of the first and second steering means respectively.

This invention thus provides a positive interlock system which is non-complex and highly efficient in operation whereby the operator cannot place the steering means in unwanted conditions of operation upon depression of a pair of steering pedals.

BRIEF DESCRIPTION OF THE DRAWINGS

Other objects of this invention will become apparent from the following description and accompanying drawings wherein:

FIG. 1 schematically illustrates a control circuit employing an interlock valve means embodiment of the present invention therewith, with portions of the control circuit and interlock valve means being broken-away for clarification purposes;

FIG. 2 is a sectional view illustrating a control and preconditioning valve employed in the control circuit;

FIG. 3 illustrates an operator control arrangement associated with a vent control valve of the control circuit; and FIG. 4 is a sectional view, taken in the direction of arrows IV—IV in FIG. 3.

BEST MODE OF CARRYING OUT THE INVENTION GENERAL DESCRIPTION

Figure 2A:
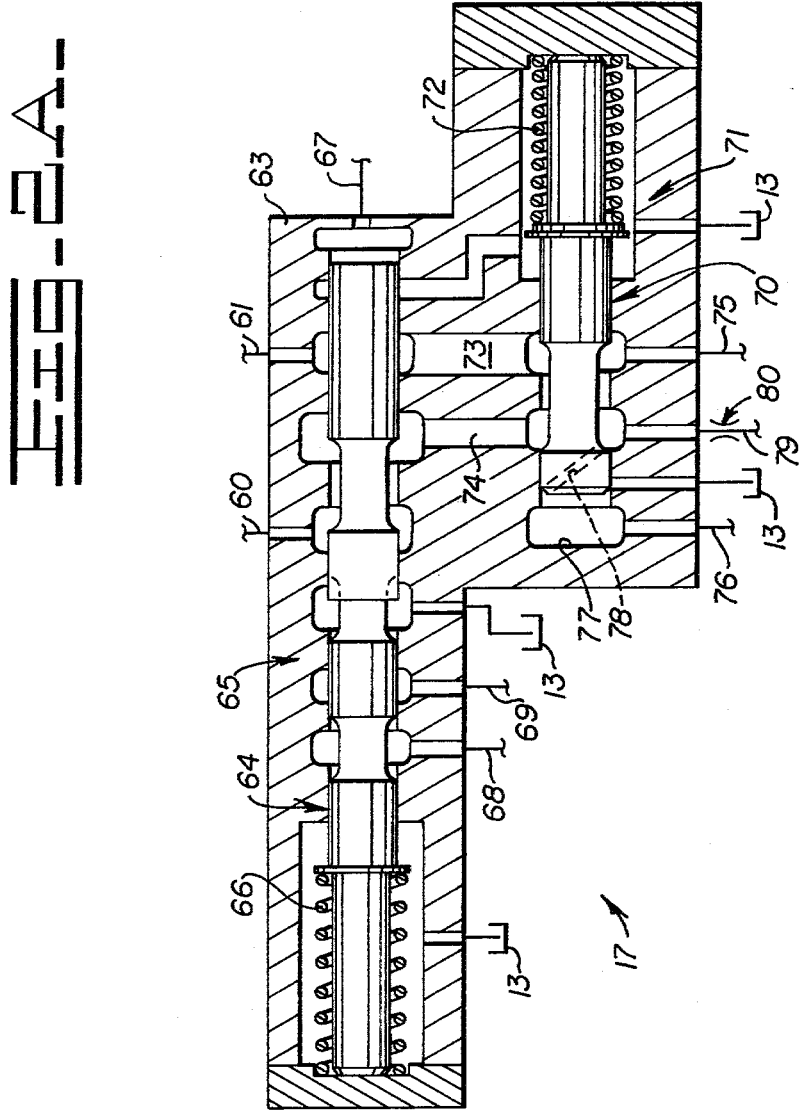
FIGS. 2A and 2B are views similar to FIG. 2, but illustrating the control and preconditioning valve in sequential conditions of operation.

FIG. 1 illustrates a control circuit comprising a source of pressurized fluid 10, including an engine-driven positive displacement pump 11 adapted to communicate pressurized fluid (hydraulic) to a line 12 from a common reservoir or tank 13. A control lever 14 of a control means or circuit 15 is arranged to be moved in a V-shaped slot 14' by an operator of the vehicle to, in turn, move a two-position vent control valve 16 in a "vent" or "run" position of operation. As more fully described hereinafter, although valve 16 is, in fact, movable to three distinct positions (FIG. 3), since two of these positions are functionally identical, valve 16 may be considered as having two (functional) positions.

Valve 16 is mechanically connected in a conventional manner to a control and preconditioning valve means 17 to function therewith to selectively control the operation and displacement of an engine-driven, variable displacement pump 18 of a fluid actuating means 19. Actuating means 19 further comprises a servo-system 20 for pump 18, a replenishing and relief valve 21 and a hydrostatic transmission 23, including pump 18 and a motor 22. The transmission package further includes a closed loop 24 interconnected between pump 18 and motor 22 in a conventional manner, as fully described in U.S. Pat. No. 3,952,514, assigned to the assignee of this application, and issued to Cyril W. Habiger on Dec. 27, 1976.

In general, when the engine is running with control lever 14 maintained in its "vent" (V) position to thus maintain vent control valve 16 in its first position illustrated in FIGS. 1 and 3, via a control arrangement 25, control and preconditioning valve means 17 will be readied for operation, as shown in FIG. 2A. As described more fully hereinafter, control lever 14 must be moved in its "vent" position upon starting of the vehicle, i.e., the control circuit cannot be activated and the associated vehicle moved when the engine is started with control lever 14 in one of its "run" (R) positions. Shifting of control lever 14 to one of its "run" positions (forward or reverse) from its "vent" position will function to communicate pressurized fluid from source 10, through control and preconditioning valve means 17 (FIG. 2B), to replenishing and relief valve 21 to activate transmission 23, and also to normally "on" brakes 26 to release the brakes.

Control lever 14 is further connected, as schematically illustrated at 27, to a standard underspeed actuator 28. The position of a piston 29 of actuator 28 will determine the displacement of pump 18, via a linkage 30 interconnected between servo-system 20 and underspeed actuator 28, between minimum ("full underspeed") and maximum ("zero underspeed") levels. The position of piston 29 of underspeed actuator 28, and thus the displacement of pump 18, is responsive to a fluid pressure differential or signal created across a venturi 31 and which is communicated to either end of piston 29, the pressure differential being proportional to the speed of pump 11 and the engine.

Should the operator desire to override such fluid pressure signal, he need only depress a pedal 32 of an override or pilot means 33. Depression of the pedal will generally function to vary the fluid pressure signal in a closely controlled manner to selectively reposition piston 29 of underspeed actuator 28 whereby the displacement of pump 18 can be changed for certain operating conditions of the vehicle. As more fully described hereinafter, release of override pedal 32 will not affect the prior setting of speed control lever 14, associated vent control valve 16, nor control and preconditioning valve means 17, whereby underspeed actuator 28 will be permitted to resume normal operation.

As suggested above, control lever 14 must be initially placed in its "vent" position, illustrated in FIGS. 1 and 3, upon or after starting of the engine to assume or resume normal operation of the vehicle, e.g., brakes 26 will not be released and the vehicle cannot be moved should the engine be started with control lever 14 maintained in one of its "run" positions. Furthermore, once the engine has been started, with control lever 14 in its "vent" position, control and preconditioning valve means 17 will continuously remain in a preconditioned state of operation (FIG. 2A or 2B) whereby no special resetting of the control lever will be required.

It should be noted in FIG. 1 that a pair of actuating means 19 and 19' are employed on the vehicle for selectively varying the speed and directions of movement of drives 34 and 34', respectively, each drive being shown in the form of an endless track assembly. First and second steering means 35 and 36 include steering pedals 37 and 38, respectively. A standard linkage system 39 is adapted to selectively control the actuation of fluid actuating means 19 in a conventional manner. In particular, each linkage system 39 is suitably connected to servo-system 20 for controlling the displacement of a respective pump 18.

This invention is directed to an interlock means 40 which is connected to steering means 35 and 36 for stopping endless tracks 34 and 34' and the vehicle associated therewith in response to movement of pedals 37 and 38 of both steering means 35 and 36 to preselected positions. In particular, pedals 37 and 38 are mechanically connected in a conventional manner to a pair of first and second spools 41 and 42 of first and second valve means 43 and 44, respectively. Positioning of a respective pedal 37 or 38 in one of its illustrated forward (F), neutral (N), or reverse (R) positions of operation will responsively move a respective spool 41 or 42.

As will be described more fully hereinafter, the vehicle will stop when both pedals 37 and 38 are depressed to their "N" or "R" positions or when one pedal is depressed to its "N" position and the other pedal is depressed to its "R" position. The stopping of the vehicle is effected by deactivating pump 18 of each actuating means 19 and 19' so that the operator is enabled from inadvertently placing the vehicle in an unwanted travel mode of operation. It should be understood that the "F" and "R" positions of steering means 35 and 36 are reversible, i.e., depending upon the particular "run" position of control lever 14 in slot 15 for forward or reverse operation of the vehicle.

DETAILED DESCRIPTION

As shown in FIG. 1, communication of pressurized fluid from source 10 to line 12 and venturi 31 will create a pressure differential or fluid signal between a line 45, connected to an upstream side of venturi 31, and a line 46 which is connected to a throat portion of venturi 31, through a restricted orifice 47. This differential pressure will be communicated to opposite ends of piston 29 of underspeed actuator 28, via lines 48 and 49, the latter line being connected to line 46 through a quick response or shunt valve 50. Underspeed actuator 28 will function in a conventional manner during normal engine operation to regulate servo-systems 20 of both fluid actuating means 19 and 19' for controlling the displacement of pumps 18 thereof. As suggested above, movement of control lever 14 into one of its "run" positions will function to run the pumps 18 of the two transmission packages at the same speed, whereas depression of one steering pedal 37 or 38 will override a respective servo-system 20 whereby the pumps will be run at different speeds, e.g., depression of the one of the foot pedals in its "F" range will slow down the displacement and speed (down-stroke) of the associated pump 18 and thus the speed of a respective track 34 or 34'.

Shunt valve 50 primarily functions to interconnect line 45 and 49 for fluid flow therebetween and is adapted to open to communicate line 49 with lines 46 and 48 when piston 29 of underspeed actuator 28 moves downwardly quickly to create a pressure surge in line 37. In normal operation, piston 29 will move downwardly in response to a lowering of the differential fluid pressure at opposite ends thereof to thus actuate servo-system 20 towards full underspeed (minimum pump displacement).

A pressure regulating valve 51 is connected in a line 52 which is, in turn, connected to a line 53 which communicates the downstream side of venturi 31 with servo-system 20. The downstream side of pressure regulating valve 51 is connected to a line 54 for supplying pressurized fluid at a predetermined level to one side of replenishing and relief valve 21.

A by-pass arrangement 55 may be employed in the control circuit and includes a line 56 having an adjustable orifice 57 connected therein. The by-pass arrangement is connected across venturi 31 to closely control and finely tune the differential pressure drop across the venturi and the fluid pressure signal communicated to underspeed actuator 28, as described above. This fine tuning may be utilized to compensate for any manufacturing variances or the like in venturi 31, the various pumps, etc.

A pressure relief valve 58 is connected in line 54 to ensure that replenishing and relief valve 21 is charged in a conventional manner with a predetermined level of pressurized fluid. Valve 21 further communicates with a line 59 which connects with actuating chambers (not shown) of brakes 26 of the vehicle. When the actuating chambers of brakes 26 are vented, springs (not shown) thereof hold the brakes in their "on" or engaged condition of operation and the brakes are released when pressurized fluid is communicated to such chambers via a line 60, a check valve 60' and line 59. Communication of pressurized fluid to line 59 will also charge replenishing and relief valve 21 to activate hydrostatic transmission 23 for operation by the operator.

Line 54 is further connected to a line 61, having a check valve 62 therein, to communicate pressurized fluid to control and preconditioning valve means 17. In the vent positions of control lever 14 and vent control valve 16, control and preconditioning valve means 17 will be conditioned to prevent communication of pressurized fluid from line 61 to line 60 and thus to replenishing and relief valve 21 and brakes 26.

CONTROL AND PRECONDITIONING VALVE 17

Referring to FIGS. 1 and 2, control and preconditioning valve means 17 comprises a housing 63 having a spool 64 of a flow control valve 65 reciprocally mounted therein. Spool 64 is biased rightwardly by a compression coil spring 66 towards its illustrated closed position and is adapted to be moved leftwardly to its open position, against the force of the spring, when pressurized fluid is communicated to the right end thereof, via a line 67. In its closed position illustrated in FIG. 2, flow control valve 65 is positioned to connect a pair of lines 68 and 69 which are further connected to opposite ends of underspeed actuator 28 (FIG. 1) to thus deactivate the same.

During this closed position of flow control valve 65, spool 64 is positioned to block communication of pressurized fluid to outlet line 60. It should be further noted in FIG. 2 (and assuming that the engine is not running) that a spool 70 of a preconditioning valve 71 is urged to its illustrated closed position by a compression coil spring 72 to block communication between a pair of passages 73 and 74, defined in housing 63. Spool 70 will remain in this blocking and closed position when the engine is not running and also when an attempt is made to start the engine with control lever 14 (FIG. 1) in one of its "run" positions. Accordingly, pump pressure cannot be communicated through valve 71 and back to valve 65 for egress into line 60.

However, when the engine is running with control lever 14 and valve 16 (FIG. 1) being initially positioned in their "vent" positions, valve 71 will move to its open position illustrated in FIG. 2A. Thus, pressurized fluid in line 61 will communicate through passage 73, a line 75, valve 16, and into a line 76. Line 76 communicates with an actuating chamber 77, defined in housing 63 at the left end of spool 70, to thus pressurized the chamber to move the spool rightwardly to its open position. A restricted passage 78 is formed through the left end of spool 70 to ensure that chamber 77 is drained to tank 13 when the engine has been shut-down, and to further ensure that sufficient fluid pressure is communicated to chamber 77 when control lever 14 is subsequently moved to a "run" position, to maintain valve 71 open, as shown in FIG. 2B.

Thus, pressurization of chamber 77 will shift spool 70 rightwardly against the opposed biasing force of spring 72 to move restricted passage 78 out of communication with tank 13 and to open communication between passages 73 and 74, and to also communicate passage 73 with chamber 77, via passage 78, as shown in FIG. 2A. The control circuit, including valve 71, is now preconditioned to continuously maintain valve 71 in its open position so long as the engine remains running and irrespective of the open or closed position of valve 65. It should be noted that prior to this preconditioning of valve 71, a line 79, having a restricted orifice 80 therein, is vented to tank 13 along with passage 74. It should be further noted that upon shifting of spool 70 of valve 71 to its open position illustrated in FIG. 2A, that passages 73 and 74 will communicate with each other and passage 73 will further communicate with vented line 75, through valve 16 (FIG. 1).

Assuming now that the control circuit has been preconditioned in the manner described above and that the operator now shifts the control lever 14 (FIG. 1) from its "vent" position to one of its "run" positions, valve 16 will shift rightwardly to its second, closed position in response thereto. Valve 16 will thus block communication of line 67 with drain 13 and will also block communication of line 75 with line 76. However, since spool 70 of valve 71 has been shifted to its open position illustrated in FIGS. 2A and 2B, pressurized fluid in passage 73 will continuously communicate with chamber 77, via restricted passage 78, to retain spool 70 in this open position.

Figure 2B:
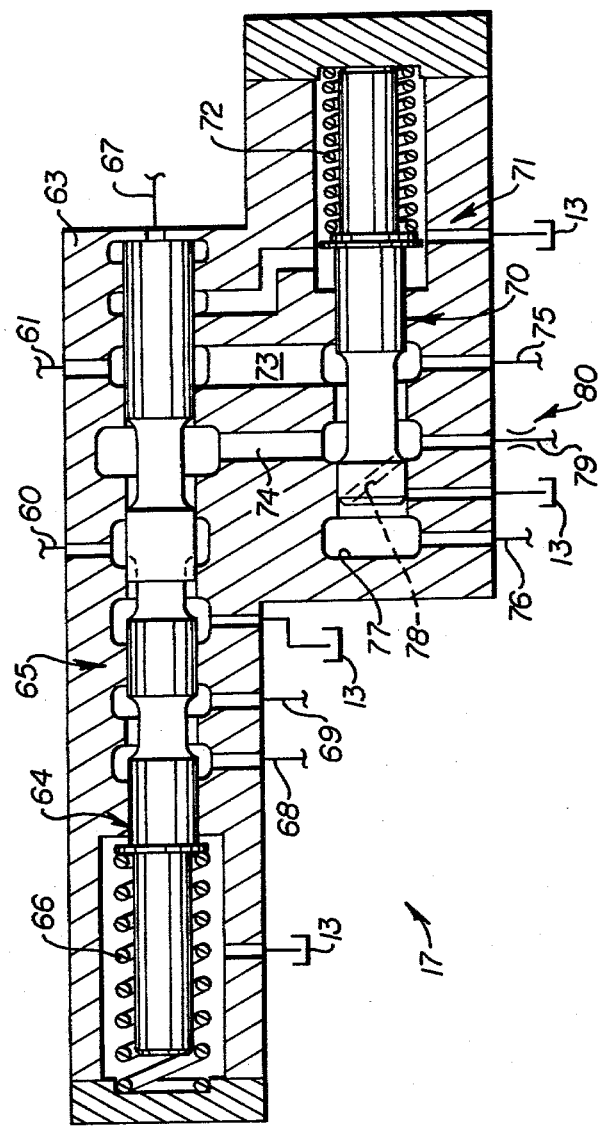

Simultaneously therewith, pressurized fluid from line 79 will communicate with the right end of valve 65, via line 67, to shift spool 64 thereof leftwardly to its FIG. 2B open position. Such shifting of spool 64 will also block communication between lines 68 and 69 to permit underspeed actuator 28 (FIG. 1) to perform its normal function and will also open communication of passage 74 with line 60. Pressurized fluid is thus communicated to brakes 26 to release them and also to replenishing and relief valve 21 to activate the control circuit for operation of hydrostatic transmission 23.

OVERRIDE MEANS 33

Referring once again to FIG. 1, when the control circuit is maintained in its "run" condition of operation, the automatic operation of underspeed actuator 28 may be overridden by depressing override pedal 32. Depression of pedal 32 through a band "a" will rotate (or slide, depending on the preferred construction) a valve spool 81 of override or pilot means 33 to open a normally closed variable orifice 82. Thus, the operator may selectively alter the speed of both pumps 18 and the vehicle by shunting differential fluid pressure, as between a pair of lines 83 and 84 which connect with lines 48 and 49, respectively. The control and gradual change of such differential fluid pressure will directly affect the positioning of each servo-system 20 for pumps 18 of fluid actuating means 19 and 19'.

Upon release of pedal 32, orifice 82 will again close and the control circuit will return to its normal operation, as previously established by the particular positioning of control lever 14 (FIG. 1). So long as override pedal 32 is only moved through band "a", valve spool 64 of valve 65 will remain in its FIG. 2B position, under the force of pressurized fluid communicated to the right end thereof by line 67.

However, should the operator desire to stop the vehicle during the override phase of vehicle operation, he need only depress pedal 32 into band "b" in FIG. 1, whereby a second variable orifice 85 of override means 33 will open to vent a line 86, connected to line 67, to tank 13. Such venting will permit spool 52 of valve 53 to move back to its closed position illustrated in FIG. 2A to block communication of passage 74 with line 60 and also permit line 60 to vent to tank 13. However, spool 70 of valve 71 will remain in its open position illustrated in FIG. 2A, since chamber 77 will remain pressurized, via passage 78.

OPERATOR CONTROL ARRANGEMENT 25

FIGS. 3 and 4 illustrate operator control arrangement 25 which interconnects control lever 14 with vent control valve 16 and linkage 27 which is connected to underspeed actuator 28. Operator control arrangement 25 comprises a rock shaft 87 having a bifurcated control member 88 secured thereon and mechanically connected to control lever 14 in a conventional manner. Thus, pivoting of control member 88 in either direction, depending on the particular "run" position (either forward or reverse) of control lever 14 in slot 14', will selectively actuate vent control valve 16. Linkage 27 comprises a lever 89 pivotally mounted on shaft 87, a cable 90 secured to an upper end of lever 89 by a pin 91, and a stop member 92, also secured to lever 89.

Assuming that the operator pivots control member 88 into one of the "run" ranges illustrated in FIG. 3, stop member 92 will engage a respective one of a pair of spring-loaded sunbber means 93, mounted on control member 88 and disposed on either side of stop member 92. The operator will thereafter "feel" when control lever 14 and mechanically associated control member 88 have passed through the "run" range and have reached their "over-travel" positions, with servo-systems 20 having placed associated pumps 18 in their condition for maximum displacement, when snubber means 93 "bottoms out" on control member 88. Each snubber means 93 may comprise a pin member 94 reciprocally mounted on control member 88 and biased towards stop member by a compression coil spring 95.

A link 96 is pivotally interconnected between an upper end of control member 88 and an upper end of a bellcrank 97. The bellcrank is pivoted on a stationary bracket 98 by a pin 99 and has a lower end thereof pivotally connected to an end extension 100 of a spool 101 of valve 16, by a link 102. Spool 101 is reciprocally mounted in a housing 103 of valve 16 and is normally maintained in its illustrated vent position by a self-centering compression coil spring 104. A pair of washers 105 and 106 are slidably mounted on spool extension 100 to normally abut a pair of shoulders 107 and 108, respectively, formed on the extension.

As mentioned above, although valve 16 is movable to three distinct positions in FIG. 3, i.e., the illustrated vent position and positions on either side thereof whereby lines 67, 75 and 76 are all blocked, the latter two positions are functionally identical and may be considered collectively as constituting the "closed position" of valve 16 for explanation purposes herein.

It should be further noted that operator control arrangement 25 is suitably calibrated and arranged to first actuate valve 16 and then cable 90 of linkage means 27, upon movement of control lever 14 into one of its "run" positions. As shown in FIG. 3, this time delay is primarily set by a clearance "c", defined between each snubber means 93 and stop member 92. The time delay ensures that the control circuit is conditioned and charged with pressurized fluid, before servo-system 20 of each pump 18 is stroked by linkage 30 (FIG. 1).

Furthermore, upon movement of spool 101 leftwardly, for example, from its centered and vent position illustrated in FIG. 3, a first land 109 thereof will move through a distance "X" and a second land 110 thereof will move through a slightly greater distance "Y". This timed sequence, which will also occur upon movement of spool 101 in the opposite rightward direction, will ensure that lines 75 and 76 are blocked before vent line 67 is closed so that there is no condition and position of control lever 14, when the engine is shut-down and thereafter restarted, wherein the vehicle will be allowed to move inadvertently.

INTERLOCK MEANS 40

Referring once again to FIG. 1, spools 41 and 42 of interlock means 40 may be slidably mounted in a common housing 111 having a plurality of passages defined therein, including a pair of inner passages 112 and 113. Spools 41 and 42 are normally spring-biased leftwardly by springs 114 and 115, respectively, to normally maintain pedals 37 and 38 in their raised positions (F). When spools 41 and 42 are in this position, a line 116, connected to line 49, is blocked from communication with passage 112 and passage 112 is blocked from communication with line 83. Also, a vent line 117 is blocked by spool 41 and passage 113 is blocked from communication with line 86 by spool 42.

The vehicle can be steered in a normal manner upon depression of one pedal through its full range of travel, or both pedals 37 and 38 short of their "N" positions. It should be noted that upon depression of both pedals 37 and 38 in their "F" ranges, that lines 47 and 116 will communicate to thus reduce and modulate the differential fluid pressure prevalent in lines 48 and 49, on either side of underspeed actuator 28. Simultaneously therewith, linkages 39, mechanically interconnected between pedals 37 and 38 and servo-system 20, will control and downstroke pumps 18 of fluid actuating means 19 and 19' simultaneously. The mechanical connection of each servo-system 20 to a respective pump 18, as well as the slaved mechanical connection between the two pumps, is fully disclosed in U.S Pat. No. 3,990,320, issued on Nov. 9, 1976 to Cyril W. Habiger. The modulation of the pressure fluid signal, upon depression of pedals 37 and 38, is largely occassioned by the preselected sizing and arrangement of standard modulating slots 118 and 119 formed on spools 41 and 42, respectively.

It should be further noted in FIG. 1 that should both pedals 37 and 38 be depressed to their "N" positions of operation or beyond, that spools 41 and 42 will shift rightwardly to vent line 86, through passage 113 and line 117. Such venting will also vent line 67 to depressurize the right end of valve 65 to return it to its FIG. 2, closed position. However, valve 71 will remain in its open position, illustrated in FIG. 2A, to again precondition the control circuit for operation in the manner above-described. Thus, release of at least one of the pedals 37 or 38 back beyond its "N" position and into its "F" range of operation will close-off vent line 117 to reestablish fluid pressure in line 67 to move valve 65 back to its operational and open position illustrated in FIG. 2B.

INDUSTRIAL APPLICABILITY

The control circuit illustrated in FIG. 1 and, in particular interlock means 40, finds particular application to construction vehicles, such as track-type tractors or excavators, employing a pair of hydrostatic transmissions 23 thereon for driving tracks 34 and 34'. Although particularly adapted for track-type vehicles, the control circuit could be employed in conjunction with wheel-type vehicles as well.

Assuming that the engine of the vehicle is running to drive pump 11 and that control lever 14 is placed in its "vent" (V) position illustrated in FIGS. 1 and 3, pump pressure, as established by pressure regulating valve 51, will communicate pressurized fluid through line 12 and through venturi 31. During this condition of operation, vehicle brakes 26 are held in an "on" condition of operation since line 60 communicates with tank 13, through control and preconditioning valve means 17 (FIG. 2A).

Line 59, common to replenishing and relief valve 21 and brakes 26, will simultaneously communicate with the tank to vent this side of the valve. The parallel lines comprising loop 24 of hydrostatic transmission 23 are thus interconnected or "shunted" whereby the transmission is rendered non-operational in a conventional manner. It is further assumed that override pedal 32 has not been depressed to thereby maintain orifices 82 and 85 thereof in closed conditions of operations.

The fluid pressure differential or signal thus occasioned as between lines 45 and 46 will be communicated to opposite ends of underspeed actuator 28 (but momentarily equalized, as discussed below), via lines 48 and 49, respectively, to ready the control circuit for normal operation. Pressure regulating valve 51 will maintain a predetermined back pressure on the downstream side of venturi 31 (e.g., 350 psi) whereas pressure relief valve 58 will function to charge one side of replenishing and relief valve 21 with fluid maintained at a predetermined pressure (e.g., 150 psi). It should be further noted in FIG. 2A that lines 68 and 69 communicate to equalize the pressure on opposite sides of underspeed actuator 28, prior to shifting spool 64 leftwardly to its FIG. 2B position.

It should be further noted in FIGS. 1 and 2A that pressurized fluid in line 61 will communicate with line 75 which, in turn, communicates with line 76, through valve 16. The pressure in line 76 will charge actuating chamber 77 of valve 71 to shift spool 70 thereof rightwardly to its FIG. 2A open position whereby passage 73 will communicate with passage 74 and also with line 79. Restricted passage 78, formed in spool 70, and restricted orifice 80 are suitably sized to constantly retain sufficient fluid pressure in chamber 77 during the "vent" condition of operation to maintain spool 70 in its FIG. 2A, open position.

When the operator shifts control lever 14 into one of its two "run" positions (forward or reverse), illustrated in FIGS. 1 and 3, valve 16 will shift to its open position to block communication of line 75 with line 76 and to also block communication of line 67 with tank 13. Pressurized fluid will thus be communicated to line 67 from line 79 to pressurize the right end of valve 65 to move spool 64 thereof leftwardly to its open position illustrated in FIG. 2B. Such positioning of spool 64 will block communication between lines 68 and 69 to render underspeed actuator 28 operational and to also communicate passage 74 with line 60. Pressurized fluid will thus be communicated to replenishing and relief valve 21 and to brakes 26 whereby hydrostatic transmission 23 is made operational to drive tracks 34 and 34' of the vehicle upon release of brakes 26. The operator is now free to move control lever 14 between the minimum and maximum speed positions in the "run" portion of slot 14', subject to automatic control of servo-systems 20 by underspeed actuator 28, to drive the two pumps 18 at the same speed.

Should the operator desire to override the operation of underspeed actuator 28, he need only depress override pedal 32 (FIG. 1) whereby variable orifice 82 will open to connect lines 83 and 84 whereby the pressure differential normally communicated to opposite sides of the underspeed actuator may be selectively varied to modulate the pressure fluid signal. Such an override condition of operation will continue throughout depression of pedal 32, through band "a", and control and preconditioning valve means 17 will remain in its operational condition illustrated in FIG. 2B.

However, should the operator depress pedal 32 further and into band "b" (FIG. 1), variable orifice 85 will open whereby line 86 will be vented to tank 13 and spring 66 will move spool 64 back to its closed position illustrated in FIG. 2A. Thus, replenishing and relief valve 21, as well as the actuating chambers of brakes 26, will be vented to tank 13 to stop the vehicle. However, since fluid pressure is being continuously supplied to actuating chamber 77, via restricted passage 78, spool 59 of valve 71 will remain in its FIG. 2A open position to continuously precondition control and preconditioning valve means 17 for subsequent operation. Upon release of pedal 32, orifices 82 and 85 will both close whereby fluid pressure will again build up in line 67 to shift spool 64 leftwardly whereby control and preconditioning valve means 17 will reassume its operational condition, illustrated in FIG. 2B.

Referring to FIG. 3, should the operator move control lever 14 into an "over-travel" range of actuation, stop member 92 will abut a respective snubber means 93 to depress pin member 94 thereof against control member 88 to alert the operator by "feel" that this condition of operation has been reached. In particular, the operator will be alerted that servo-systems 20 and associated pumps 18 have been placed in their maximum displacement and speed conditions of operations.

Assuming normal steering operation of the vehicle with control and preconditioning valve means 17 maintained in its FIG. 2B condition of operation and pedal 32 of override means 33 being in its raised position to maintain orifices 83 and 85 closed, depression of one pedal 37 or 38 will function to slow-down an associated track 34 or 34' to steer the vehicle in a conventional manner, via a respective linkage 39. The depressed pedal may move all the way through its "R" position without affecting the differential fluid pressure signal communicated to underspeed actuator 28 from venturi 31 and without affecting the reset pressure in line 86. Depression of the pedal into the "R" range will, of course, counterrotate the associated track 34 relative to its run position, dictated by the positioning of control lever 14 in either its forward or reverse position in slot 14'.

Assuming depression of pedal 37 to at least its "N" position in FIG. 1 and simultaneous depression of pedal 38 to a position short of position "N", linkages 39 will function to downstroke pumps 18 and spools 41 and 42 will open to communicate line 116 with line 83 to selectively vary the fluid pressure signal communicated to either side of underspeed actuator 28 for further controlling the operation of servo-systems 20, via linkages 30. If both pedals 37 and 38 are depressed to or past their "N" positions, metering slots 118 and 119 will fully open to reduce the differential fluid pressure signal to zero to deactivate underspeed actuator 28 and simultaneously communicate lines 67 and 86 with vent line 117 to return spool 64 of valve 65 back to its FIG. 2A position. Thus, tracks 34 will stop.

The following chart (wherein "SIGNAL" refers to the differential fluid pressure signal communicated to underspeed actuator 28) depicts the various operational modes of the vehicle:

| VEHICLE MODE | PEDAL POSITIONS PEDAL 37 | PEDAL 38 | SIGNAL TO 28 (DIFF. PRES.) | LINE 83 TO 116 (MOD. SIGNAL) | LINE 117 (VENT) | VALVE 65 |
|---|---|---|---|---|---|---|
| FORWARD | F | F | YES | CLOSED | CLOSED | OPEN (FIG. 2B) |
| PIVOT TURN (1st Dir.) | N | F | YES | CLOSED | CLOSED | OPEN |
| SPOT TURN (1st Dir.) | R | F | YES | CLOSED | CLOSED | OPEN |
| PIVOT TURN (2nd Dir.) | F | N | YES | CLOSED | CLOSED | OPEN |
| STOP | N | N | NO | OPEN | OPEN | CLOSED (FIG. 2A) |
| STOP | R | N | NO | OPEN | OPEN | CLOSED |
| SPOT TURN (2nd Dir.) | F | R | YES | CLOSED | CLOSED | OPEN |
| STOP | N | R | NO | OPEN | OPEN | CLOSED |
| STOP | R | R | NO | OPEN | OPEN | CLOSED |

The above chart assumes that control lever 14 is in its forward (F) run position in slot 14'. The above vehicle modes would, of course, be reversed when control lever 14 is maintained in its reverse (R) run position in FIG. 1, i.e., the "F'"s and "R'"s on the chart would be reversed.

From the above description it can be seen that interlock means 40 provides a non-complex and highly efficient addition to the above-described control circuit for preventing the operator from inadvertently placing the vehicle in an unwanted condition of operation. For example, without the use of interlock means 40, the operator could decide to brake the vehicle and by past experience expect to do so by fully depressing steering pedals 37 and 38. However, full depression of pedals 37 and 38 into the "R" ranges would function to counter-rotate the tracks. Interlock means 40 will, on the other hand, provide the operator with his expected braking mode of operation. Those skilled in the art will appreciate that other unwanted conditions of operation will be avoided by application of this invention to either a track-type or wheeled vehicle.

Other aspects, objects and advantages of this invention can be obtained from a study of the drawings, the disclosure and the appended claims.

I claim:

1. In a vehicle having a first drive (34), a second drive (34'), fluid actuating means (19,19') for selectively varying the speed and directions of movement of said first (34) and second (34') drives, control means (15) for controlling said fluid actuating means (19,19'), and first (35) and second (36) steering means each being movable to a first (F), second (N), and third (R) position of operation for selectively controlling said fluid actuating means (19,19'), independently of actuation of said control means (15), to steer said vehicle, the improvement comprising interlock means (40) for stopping said first and second drives and said vehicle in response to movement of both said first (35) and second (36) steering means to preselected ones of said positions of operation, said interlock means (40) including first (43) and second (44) valve means for actuation in response to movement of said first (35) and second (36) steering means, respectively, to stop said first and second drives (34,34') and said vehicle when both of said first (35) and second (36) steering means are moved to their second (N) or third (R) positions or when one of said first (35) and second (36) steering means is moved to its second position (N) and the other one thereof is moved to its third position (R).

2. The vehicle of claim 1 wherein said interlock means (40) further includes means (112,118,119) for modulating fluid pressure through said first (43) and second (44) valve means when one of said steering means (35,36) is in its first position (F) of operation and wherein the other steering means is in its first (F), second (N) or third (R) position of operation.

3. The vehicle of claim 1 wherein said interlock means (40) further includes means (113,117) for venting fluid through said first (43) and second (44) valve means when both of said first (35) and second (36) steering means are moved to their second (N) or third (R) positions or when one of said first (35) and second (36) steering means is moved to its second (N) position and the other one thereof is moved to its third position (R).

4. A track-type vehicle comprising
   a first endless track (34),
   a second endless track (34'),
   fluid actuating means (19,19') for selectively varying the speed and directions of movement of said first (34) and second (34') tracks,
   control means (15) for controlling said fluid actuating means (19,19'),
   first (35) and second (36) steering means each being movable to a first (F), second (N), and third (R) position of operation for selectively controlling said fluid actuating means (19,19'), independently of actuation of said control means (15), to steer said vehicle, and
   interlock means (40) for stopping said first and second tracks and said vehicle in response to movement of both said first (35) and second (36) steering means to preselected ones of said positions of operation, said interlock means (40) including first (43) and second (44) valve means for actuation in response to movement of said first (35) and second (36) steering means, respectively, to stop said first and second tracks (34,34') and said vehicle when both of said first (35) and second (36) steering means are moved to their second (N) or third (R) positions or when one of said first (35) and second (36) steering means is moved to its second position (N) and the other one thereof is moved to its third position (R).

5. The vehicle of claim 4 wherein said control means (15) includes a source of pressurized fluid (10), venturi means (31) for receiving pressurized fluid from said source (10) and for creating a fluid pressure differential signal thereacross, and underspeed actuator means (28) for receiving said signal from said venturi means (31) to control said fluid actuating means (19,19′).

6. The vehicle of claim 5 wherein movement of each of said first (35) and second (36) steering means into at least one of said positions (F,N,R) will modulate said signal.

7. The vehicle of claim 5 further including override means (33) for selectively varying said signal.

8. The vehicle of claim 4 wherein said control means (15) further includes flow control valve means (65) movable between a closed position for blocking communication of pressurized fluid to said fluid actuating means (19,19′) and an open position for communicating pressurized fluid to said fluid actuating means (19,19′) and said interlock means (40) includes means (67) for automatically moving said flow control valve means (65) to its closed position in response to movement of both of said first (35) and second (36) steering means to said preselected ones of said positions of operation.

9. The vehicle of claim 4 wherein said fluid actuating means (19,19′) includes hydrostatic transmission means (23) for controlling the speed and direction of each of said first (34) and second (34′) tracks.

10. The vehicle of claim 9 further including braking means (26) for stopping said first (34) and second (34′) tracks and said interlock means (40) includes means for effecting said stopping in response to movement of both of said first (35) and second (36) steering means to said preselected ones of said positions of operation.

* * * * *